United States Patent [19]

Bradley

[11] 4,323,132

[45] Apr. 6, 1982

[54] MOUNTING ADAPTER FOR A FORK LIFT TRUCK

[75] Inventor: Richard S. Bradley, Fairmont, Minn.

[73] Assignee: Weigh-Tronix, Inc., Fairmont, Minn.

[21] Appl. No.: 251,051

[22] Filed: Apr. 6, 1981

Related U.S. Application Data

[63] Continuation-in-part of Ser. No. 180,802, Aug. 25, 1980.

[51] Int. Cl.³ .................. G01G 19/08; G01G 23/00
[52] U.S. Cl. ................................. 177/139; 177/128
[58] Field of Search ............................. 177/128, 139

[56] References Cited

U.S. PATENT DOCUMENTS

| | | | |
|---|---|---|---|
| 2,850,181 | 9/1958 | Hamblin | 177/139 X |
| 3,196,966 | 7/1965 | Kennedy | 177/139 |
| 3,910,363 | 10/1975 | Airesman | 177/139 |

Primary Examiner—George H. Miller, Jr.
Attorney, Agent, or Firm—Williamson, Bains, Moore & Hansen

[57] ABSTRACT

A mounting adapter provides a quick attachment means for mounting or removing an electro-mechanical scale with respect to the lift frame of a fork lift truck. The scale comprises a scale frame, which supports the lifting forks, and also includes a plurality of deformable bolts each having strain gages thereon to sense deformation of the bolts when a load is placed on the forks. Circuit means produce output signals caused by deformation of the bolts and the circuit means also converts the signals to perceptive weight readouts. The mounting adapter includes transverse frame members to which the deformable bolts are secured. Clamping means clamp the frame members of the mounting adapter to the lift frame of the fork lift truck.

3 Claims, 3 Drawing Figures

U.S. Patent  Apr. 6, 1982  4,323,132
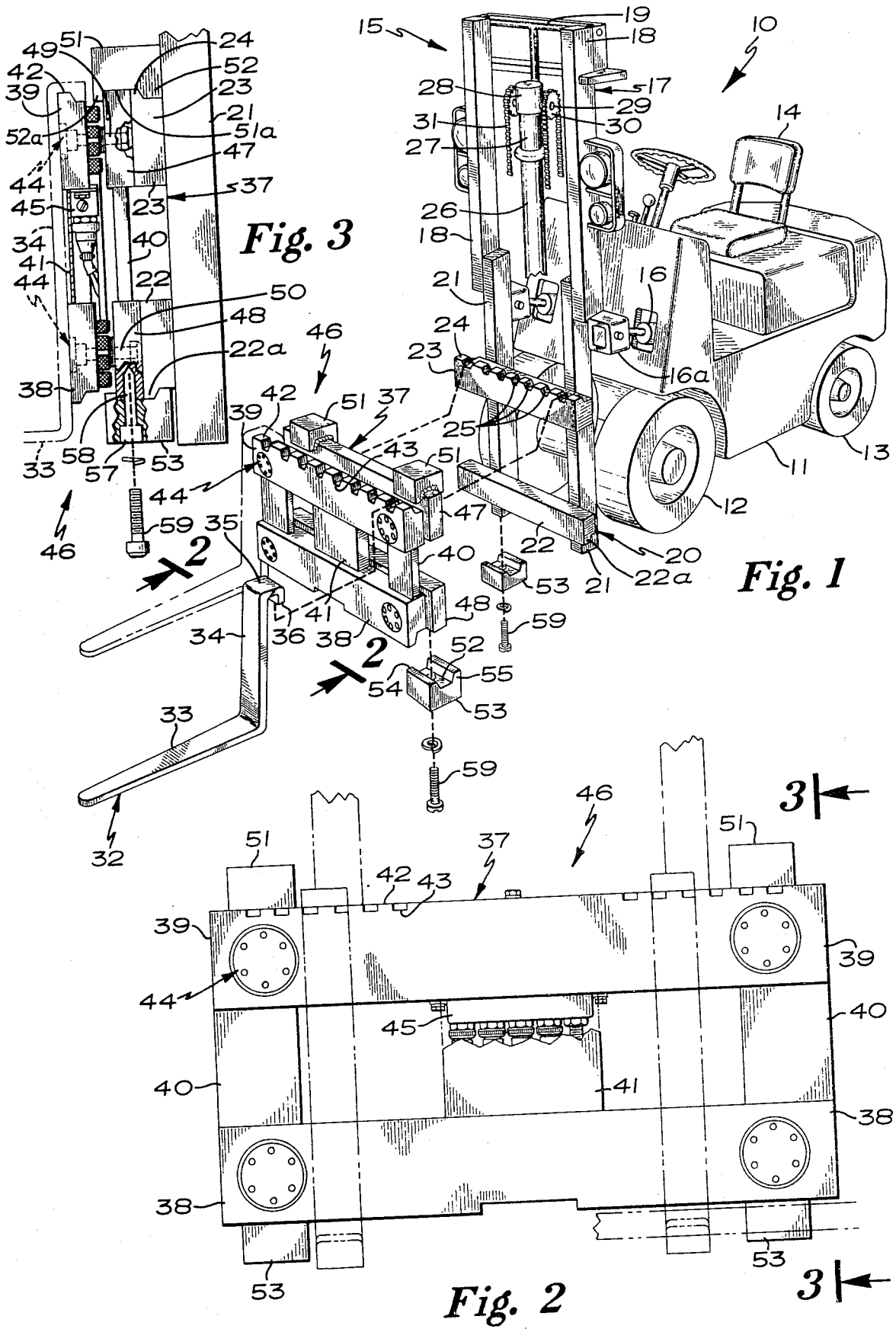

MOUNTING ADAPTER FOR A FORK LIFT TRUCK

The present application is a continuation-in-part of my co-pending application filed Aug. 25, 1980, entitled, "Fork Lift Scale", Ser. No. 180,802.

SUMMARY OF THE INVENTION

This invention relates to an adapter for providing a quick attachment means for readily mounting an electro-mechanical scale on the lift frame of a fork lift truck.

In my-co-pending application, the fork lift electromechanical scale includes a cross bar scale frame which is bolted to the lift of the fork lift truck. The bolts are deformable and function as transducers. Each bolt has a plurality of resistant strain gages thereon that sense deformation of the bolts caused by the weight of an item placed on the lifting forks. Circuit means produce output signals caused by the deformation of the bolts and these output signals are converted into perceptible weight readouts.

A mounting adapter is interposed between the conventional lift frame and the scale frame. The deformable bolts are secured to the transverse frame members of the mounting adapter, and clamps readily attach the scale frame to the conventional lift frame. With this arrangement, the scale frame may be readily attached or removed from the conventional lift frame of the fork lift truck without modifying the lift frame in any way. Alternatively, the scale frame and mounting adapter can be removed from the fork lift truck and thereby permit the lifting forks to be mounted on the lift frame in the conventional manner.

It is therefore a general object of this invention to provide a novel mounting adapter which is effective in permitting an electro-mechanical scale to be readily attached to or readily removed from the lift frame of a fork lift truck.

A more specific object of this invention is to provide an electro-mechanical scale for a fork lift truck with a mounting adapter including clamping means which serve to clamp the scale frame and its load sensing means to the lift frame of the fork lift truck without requiring any modification of the fork lift truck.

These and other objects and advantages of this invention will more fully appear from the following description made in connection with the accompanying drawings, wherein like reference characters refer to the same or similar parts throughout the several views.

FIGURES OF THE DRAWINGS

FIG. 1 is a front perspective view of a fork lift truck incorporating the scale and mounting adapter with certain parts thereof exploded for clarity;

FIG. 2 is a front elevational view of the electromechanical scale and mounting adapter taken approximately along line 2—2 of FIG. 1 and looking in the direction of the arrows; and FIG. 3 is a cross-sectional view taken approximately along line 3—3 of FIG. 2 and looking in the direction of the arrows.

DESCRIPTION OF THE PREFERRED EMBODIMENT OF THE INVENTION

Referring now to the drawings and more specifically to FIG. 1, it will be seen that a conventional fork lift truck, designated generally by the reference numeral 10 is thereshown. The fork lift truck incorporates the mounting adapter for mounting the electro-mechanical scale thereon. The fork lift truck includes a conventional chassis 11 having front wheels 12 and rear wheels 13 which provide propulsion and steering of the vehicle. The chassis is provided with a conventional operator's seat 14 for accommodating the operator thereon.

The fork lift truck is also provided with a vertically disposed lift frame structure 15 at the front of the vehicle and which is secured to suitable hydraulic cylinders 16 by brackets 16a. The hydraulic cylinders permit the lift frame to be tilted in a well-known manner. The lift frame 15 includes an upper frame 17 comprised of vertical frame elements 18 interconnected by transverse frame elements 19. The lift frame also includes a lower frame 20 comprised of a pair of spaced apart, parallel frame elements 21 which are rigidly secured together at their lower end by a lower transverse frame element 22. An elongate upper transverse element 23 is rigidly affixed to the vertical frame elements 21 intermediate the ends thereof. The upper transverse frame element 23 has an upstanding lip or flange 24 adjacent the front surface thereof and, the lip 24 is provided with a plurality of notches 25 therein throughout the length thereof.

Means are provided for producing vertical translation of the lower frame 20 relative to the upper frame 17 of the lift frame structure, and this means includes a vertically disposed hydraulic cylinder 26 which has its lower end secured to the chassis. The cylinder 26 is provided with a conventional piston rod 27 which is extensible and retractable relative thereto. A mounting element 28 is affixed to the upper end of the piston rod 27 and a transverse pin or axle 29 is secured to the mounting element 28. Sprockets 30 are rotatably mounted on the transverse pin on opposite sides of the mounting element and a pair of lift chains 31 are trained about the sprockets 30. One end of each lift chain 31 is secured to the lower frame 20 and the other end of each lift chain is secured to the chassis. It will be seen that extension and retraction of the piston rod 27 produces vertical translation of the lower frame relative to the upper frame. The construction and operation of the lift frame structure as heretofore described is conventional in many commercial fork lift trucks and this structure has been described in a general way.

The fork lift truck is also provided with a pair of conventional L-shaped forks 32 each including a horizontal portion 33 and the vertical portion 34 extending in substantially right angular relation with respect to each other. Each fork 32 also includes a horizontal hook portion 35 terminates in a terminal hook portion 36. The hook portions of the fork are adapted to engage selected pairs of notches 25 in the upper transverse frame element of the lower frame so that the forks are secured in place in a well-known manner.

The fork lift truck is also provided with an electromechanical scale which is effective in determining the weight of any item or items placed on the lifting forks. The scale includes a cross bar scale frame 37 comprised of an elongate substantially straight lower cross bar 38 spaced from and substantially parallel to a substantially straight elongate upper cross bar 39. The upper and lower cross bars are rigidly interconnected to a pair of outer vertical frame elements 40 and a central vertical frame element 41. The upper cross bar 39 is provided with an upstanding lip or flange 42 having a plurality of notches 43 therein which correspond in size, location, and shape to the notches 25 in the upper transverse frame element 23 of the lift frame structure 15. These notches are adapted to accommodate and secure the forks 32.

The electro-mechanical scale also includes a plurality of load sensors which in the form of bolts 44 each having two pairs of strain gages applied thereto. The strain gages are connected by suitable electrical conductors to a junction box 45. The strain gages mounted on each of the load sensor bolts are arranged in Wheatstone bridge circuits which are connected to a source of voltage and which are also connected to an output display device. All of this structure comprising the electro-mechanical scale is described in detail in my co-pending application, Ser. No. 180,802, filed Aug. 25, 1980, and entitled "Fork Lift Scale" and the disclosure in my co-pending application is incorporated by reference herein.

In my co-pending application, the load sensor bolts 44 project through the upper and lower cross bars of the cross bar frame and through the upper and lower transverse frame elements of the lower frame 20 and are secured thereto by suitable nuts. In the present application, a mounting adapter 46 is interposed between the lower frame of the lift frame structure 15 and the cross bar scale frame 37. The mounting adapter includes an elongate substantially straight upper transverse bar 47 and an elongate substantially straight lower transverse bar 48. The upper transverse bar is provided with a pair of openings 49 therein, each being located ajdacent one end of the bar. Similarly, the lower transverse bar 48 has a pair of openings 50 therein each of which is located at one end of the bar. It will be noted that the lengths of the upper and lower bars of the mounting adapter correspond generally to the lengths of the upper and lower cross bars of the scale frame, and the upper and lower transverse frame elements of the lower frame for the lift frame structure. The load sensor bolts 44 project through the openings of 49 and 50 in the upper and lower transverse bars and are secured in place by suitable nuts 44a. Thus, the scale frame is secured to the mounting adapter rather than the lower frame of the lift frame structure.

Means are provided for securing the upper and lower transverse bars and the scale frame to the movable lower frame of the lift frame structure. This means includes a pair of upper clamping blocks 51 each being of generally rectangular configuration and each having a recess 51a in the lower surface thereof to define a rear clamping lip 52 and a front clamping lip 52a. It will be seen that the upper clamping block is received within the recess 51a and with the front lip 52a projecting downwardly over the front upper edge of the upper transverse bar. This upper clamping block is welded to the upper transverse bar and when the upper transverse bar is positioned against the upper transverse frame element 23 of the lower frame 20 so that the rear clamping lip extends rearwardly of the notched lip 24.

A pair of lower clamping blocks 53 are also provided and each is substantially identical in construction to the upper clamping blocks 51. Each lower clamping block 53 includes a central recess 56 therein which defines a front clamping lip 54 and a rear clamping lip 55. Each lower clamping block is also provided with a centrally located opening 57 therein. The lower clamping blocks are positioned against the lower transverse bar 48 so that the front lip 54 is positioned against the front edge surface of the transverse bar. The rear lip 55 is positioned against a lower depending lip 22a on the lower transverse frame element 22 and a bolt 59 projects through the opening 57 in the associated lower clamping block and threadedly engages in a threaded recess 58 in the lower transverse bar 48. It will be appreciated that the mounting adapter and scale frame can be attached or removed from the lift frame structure by simply screwing the two bolts 59 in place or by removing the bolts from the lower transverse bar 48.

When the scale is mounted on the fork lift truck, the forks 32 are positioned in supported relation in the notches 43 of the upper cross bar 39 in the manner of my co-pending application, Ser. No. 180,802. It will be appreciated that when an item to be weighed is positioned on the lifting forks, the deformable load sensor bolts will deform in response to the load and the strain gages and circuitry will sense only the vertical load caused by the weight of the item on the fork. The circuitry produces an output signal caused by the deformation of the deformable load sensors and the output signal is converted into a perceptive readout.

The mounting adapter permits the scale to be mounted on a conventional fork lift truck without changing or altering the fork lift truck in any way. When it is desirable to use the lifting forks with the conventional lifting frame, it requires the removal of only two bolts in removing the scale and mounting adapter from the lift frame structure. This quick-attach means not only permits the electro-mechanical scale to be used with substantially any commercial fork lift trucks, but also permits removal and attachment of the scale on the fork lift by manipulation of only two bolts.

From the foregoing description, it will be seen that I have provided a novel mounting adapter which permits my unique fork lift scale to be readily mounted or removed from a conventional fork lift truck with a minimum of effort and without requiring any modification of the fork lift truck.

It is anticipated that various changes can be made in the size, shape and construction of the mounting adapter for a fork lift truck device disclosed herein without departing from the spirit and scope of the invention as defined by the following claims.

What is claimed is:

1. A mounting adapter for mounting an electro-mechanical scale on a fork lift truck having a lift frame structure and having lifting forks, the scale including a scale frame, having a pair of horizontal frame elements, for supporting the lift forks and a plurality of deformable members on the scale frame, and a plurality of electrical resistant strain gages mounted on each deformable member to sense the deformation of the latter, circuit means producing output signals caused by deformation of the deformable members means and means for converting the output signals into a perceptive weight readout, said mounting adapter including, a pair of transverse frame members secured to the scale frame elements by the deformable members and clamping means on said frame members including a plurality of clamping elements engaging said transverse members and the lift frame structure, and means securing said clamping elements to one of said frame members to permit quick attachment and detachment of the mounting adapter and scale frame on the lift frame structure.

2. The mounting adapter as defined in claim 1 wherein said transverse frame members are arranged in upper and lower relationship, said clamping elements engaging said lower frame members and the lift frame structure, and said securing means including a pair of attachment bolts securing the clamping elements to the lower frame member.

3. The mounting adapter as defined in claim 1 wherein said transverse frame members are arranged in upper and lower horizontal relationship, said clamping elements including a pair of upper clamping elements affixed to said upper transverse frame members and engaging said lift frame structure, and a pair of lower clamping elements engaging said lower transverse frame member and said lift frame structure, and means releasably securing the lower clamping elements to said lower frame members.

* * * * *